(12) United States Patent
Wegner

(10) Patent No.: US 11,866,357 B1
(45) Date of Patent: Jan. 9, 2024

(54) CORROSION AND BACTERIA CONTROL METHOD

(71) Applicant: Paul Charles Wegner, San Carlos, CA (US)

(72) Inventor: Paul Charles Wegner, San Carlos, CA (US)

(*) Notice: Subject to any disclaimer, the term of this patent is extended or adjusted under 35 U.S.C. 154(b) by 64 days.

(21) Appl. No.: 17/471,362

(22) Filed: Sep. 10, 2021

Related U.S. Application Data

(60) Provisional application No. 63/204,078, filed on Sep. 11, 2020.

(51) Int. Cl.
| | |
|---|---|
| *C02F 9/00* | (2023.01) |
| *C02F 1/72* | (2023.01) |
| *C02F 101/10* | (2006.01) |
| *C02F 1/68* | (2023.01) |
| *C02F 1/44* | (2023.01) |
| *C02F 1/66* | (2023.01) |

(52) U.S. Cl.
CPC ........... *C02F 9/00* (2013.01); *C02F 1/441* (2013.01); *C02F 1/66* (2013.01); *C02F 1/68* (2013.01); *C02F 1/727* (2013.01); *C02F 2101/105* (2013.01); *C02F 2209/10* (2013.01); *C02F 2303/08* (2013.01); *C02F 2303/20* (2013.01); *C02F 2303/22* (2013.01); *C02F 2305/02* (2013.01)

(58) Field of Classification Search
None
See application file for complete search history.

(56) References Cited

U.S. PATENT DOCUMENTS

| | | | | | |
|---|---|---|---|---|---|
| 3,772,188 | A | * | 11/1973 | Edwards | B02C 18/0092 210/197 |
| 5,227,062 | A | * | 7/1993 | Olsen | F16K 47/04 137/625.33 |
| 6,015,496 | A | * | 1/2000 | Khudenko | C02F 3/308 210/603 |
| 7,285,217 | B2 | * | 10/2007 | Simpson | C02F 3/345 210/759 |
| 8,430,112 | B2 | * | 4/2013 | Matheis | C02F 1/685 137/239 |
| 8,968,646 | B2 | * | 3/2015 | Matheis | C02F 1/76 422/123 |
| 10,435,316 | B2 | * | 10/2019 | Reed | C02F 1/5245 |
| 2007/0148256 | A1 | * | 6/2007 | Yanagihara | A61P 25/00 424/600 |
| 2010/0276363 | A1 | * | 11/2010 | Hoyland | C02F 3/345 210/615 |

(Continued)

OTHER PUBLICATIONS https://www.drugfuture.com/Pharmacopoeia/JP14e/14data/Part-II/Water_for_Injection.pdf , Water for Injection, Official Monographs for Part II, JP XIV, pp. 1078-1079 (2001) (Year: 2001).*

*Primary Examiner* — Chester T Barry
(74) *Attorney, Agent, or Firm* — Head, Johnson, Kachigian & Wilkinson, PC

(57) ABSTRACT

A method of controlling corrosion, scaling, and biological growth in equipment such as boilers, chillers, cooling towers, heat exchangers, radiators, and pipes, each having water therein, comprising: adding oxygen or air to the water; and maintaining a pH level of the water at a level greater than 7. Additionally, the total dissolved solids level of the water may be limited to less than 100 ppm and phosphate to less than 0.1 ppm.

18 Claims, 3 Drawing Sheets

(56) References Cited

U.S. PATENT DOCUMENTS

| | | | |
|---|---|---|---|
| 2014/0021115 A1* | 1/2014 | Ellegaard | C02F 9/20 |
| | | | 210/182 |
| 2014/0263039 A1* | 9/2014 | Horst | C02F 1/66 |
| | | | 210/601 |
| 2020/0140308 A1* | 5/2020 | Matsui | C02F 3/348 |
| 2023/0166018 A1* | 6/2023 | Beattie | A61M 1/32 |
| | | | 422/45 |

* cited by examiner

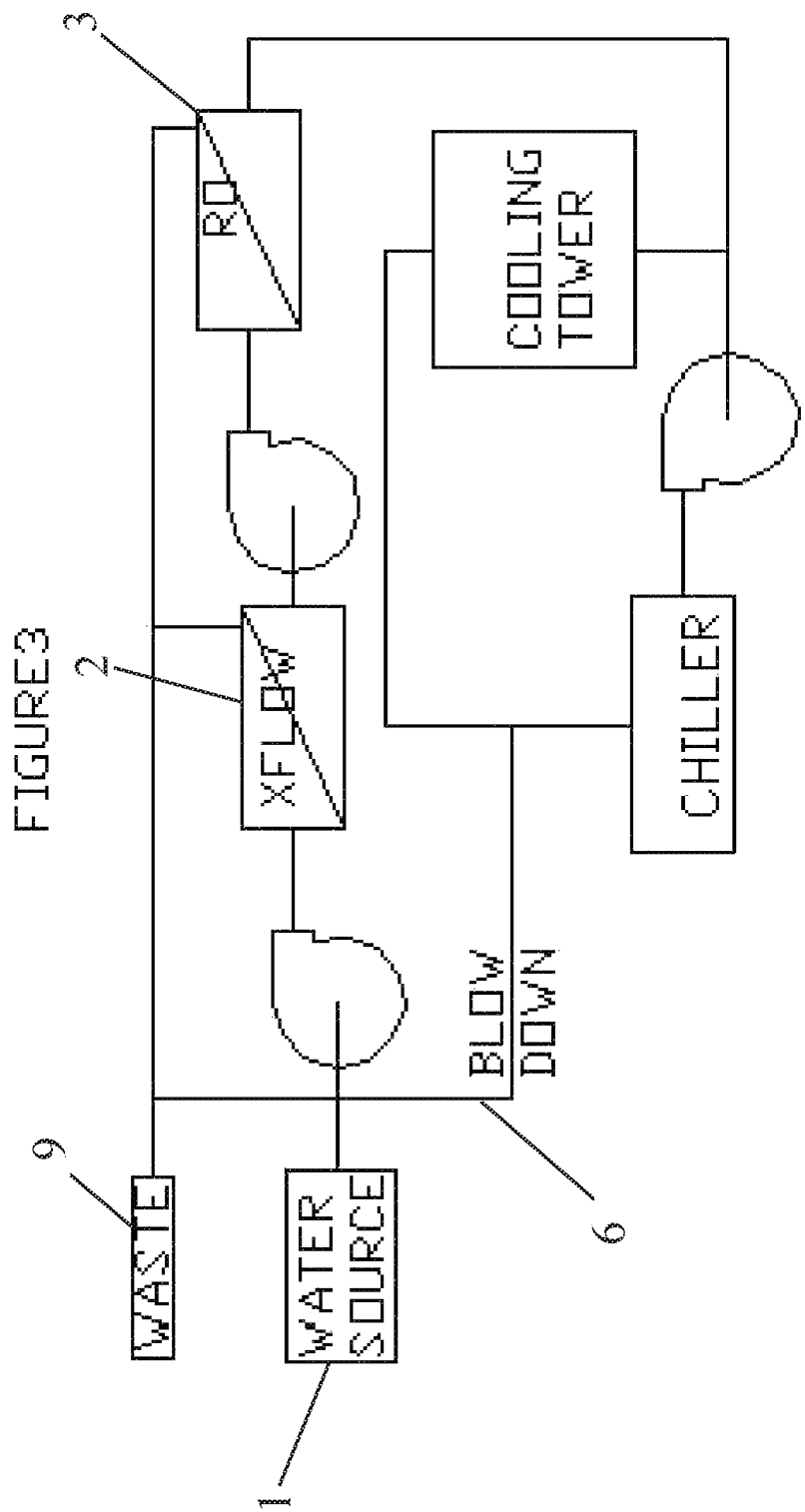

CORROSION AND BACTERIA CONTROL METHOD

BACKGROUND OF THE INVENTION

1. Cross-Reference

This application is based on and claims priority to U.S. Provisional Patent Application Ser. No. 63/204,078, filed Sep. 11, 2020, which is incorporated herein in its entirety by reference.

2. Field of the Invention

This invention relates generally, but not by way of limitation, to a method of and an apparatus controlling corrosion and biological growth in boilers, chillers, cooling towers, heat exchangers, radiators, pipes, pools, metal finishing processes, and other similar environments.

3. Description of the Related Art

Boilers, chillers, cooling towers, and the like are extremely harsh environments in which water is constantly coming into contact with equipment made of metal, concrete, and other similar materials. These materials are subject to corrosion, which dramatically decreases the usable life of the equipment. Further, the water in the systems can degrade in quality through bacterial growth and other natural processes, which can negatively impact the efficiency of these systems when uncontrolled. Accordingly, various attempts have been made to limit corrosion and/or biological growth in these systems.

Widely-accepted, traditional methods of preventing corrosion in these environments include removing oxygen from the system, maintaining the water's hardness at near the saturation point, controlling bacteria and algae growth with chemicals such as chlorine, coating the metal with silicates or phosphates, maintaining a constant pH, and excluding sunlight to further inhibit algae growth.

Traditionally, it is believed that the presence of oxygen promotes corrosion. As a consequence, oxygen is usually removed from the system's water mechanically. Additionally, reducing agents such as sodium bisulfate and hydrazine are introduced to the water to further reduce the oxygen levels of the water.

Water hardness is generally kept near saturation point in the belief that sub-saturation is corrosive and super-saturation causes scale deposits. Accordingly, the hardness of the water is kept near the saturation point to prevent corrosion and phosphates are used to prevent scale deposits from forming.

It is very common to control biological growth by introducing chlorine to the water. However, chlorine is rapidly consumed by organic materials, metals, and concentrate. Chlorine is also degraded by sunlight. Accordingly, large amounts of chlorine may be required to maintain the system. Further, chlorine is corrosive to metal even at levels less than 1 part per million (ppm). In the water, chlorine is converted to chloride which is also very corrosive to both metals and concrete.

Phosphates are typically added to control corrosion and scale deposits. However, phosphates are known to stimulate biological growth.

Boiler make up water is typically treated with water softeners to produce soft, high-alkalinity water. The water still contains some hardness which is treated with phosphates in order to inhibit scale formations. The high alkalinity, such as sodium bicarbonate, is converted to chemicals which have a corrosive pH above 10.5 in the boiler. The high pH is then, therefore, reduced with acid or buffering salts. Each of these steps increases the total dissolved solids (TDS) levels which, in itself, is corrosive. The excessive salt is then blown down and replaced with lower TDS makeup water.

All of the efforts described above are expensive, require excessive amounts of chemicals and additives, require frequent testing and correction to maintain the very delicate balance of chemicals, and are ultimately often not effective. In spite of all of the above-described processes, mineral and organic deposits still regularly build up on the equipment which impedes heat transfer and flow through the pipes and tubes. These deposits must then be either mechanically removed with brushes or chemically removed with harsh chemicals producing a hazardous liquid waste that is expensive to dispose of.

Additionally, many methods commonly used to inhibit corrosion in these systems introduce more problems than they solve and when used together, they compete against one another and are counteractive.

Therefore, it is desirable to have a low maintenance, inexpensive method of controlling corrosion and biological growth that does not include the addition of many chemicals and additives that counteract each other's effects.

SUMMARY OF THE INVENTION

One embodiment of the present invention relates to a method of controlling corrosion, scaling, and biological growth in equipment such as boilers, chillers, cooling towers, heat exchangers, radiators, and pipes, each having water therein, comprising: adding oxygen to the water; and maintaining a pH level of the water at a level greater than 7.

The step of adding oxygen to the water may be accomplished by aerating the water, adding pure oxygen, or both.

The method may further comprise the step of limiting a total dissolved solids level of less than 100 ppm.

The step of limiting the total dissolved solids level of the water may be accomplished by passing the water through a reverse osmosis membrane.

The method may further comprise the step of removing alkalinity and hardness from the water by using a weak acid resin bed in H form followed by a weak base resin in free base form.

The method may further comprise the step of removing phosphates from the water in order to inhibit biological growth.

The method may further comprise the step of adding molybdenum metal or one of its alloys to the equipment in order to inhibit corrosion of iron.

The method may further comprise the step of adding nickel metal or one of its alloys to the equipment in order to inhibit corrosion of copper.

The water may be deionized or distilled water.

The method may further comprise the step of adding if any strontium phosphate, trisodium phosphate, sodium carbonate, sodium hydroxide, potassium carbonate, potassium hydroxide, sodium bicarbonate, potassium bicarbonate, or other suitable chemicals to the water.

In the case of the equipment being a boiler, a blow-down water feed may be recycled by the additional step of mixing the blow-down water with an initial stream used to make the boiler's make-up water.

Another embodiment of the present invention relates to a method of controlling corrosion, scaling, and biological growth in a boiler comprising the steps of: filtering a water stream from a water source stream with a crossflow filter; passing the stream of water through a reverse osmosis membrane; passing the stream of water through a weak acid resin and a weak base resin; an additive if any such as sodium carbonate, sodium hydroxide, potassium carbonate, potassium hydroxide, sodium bicarbonate, potassium bicarbonate, or other suitable chemicals to the water; and oxygenating the water stream.

The step of passing the water stream through a weak acid resin and a weak base resin may comprise: passing the water stream through a weak acid resin bed in hydrogen form; and passing the water stream through a weak base resin bed in free base form.

Alternatively, the step of passing the water stream through a weak acid resin and a weak base resin may comprise passing the water stream through a mixed resin bed.

In the case of a boiler, the blow-down stream of the boiler may be recycled by mixing the blow-downstream with the water source stream.

Another embodiment of the present invention relates to a method of controlling corrosion, scaling, and biological growth in a cooling tower comprising the steps of: filtering a water stream from a water source stream with a crossflow filter; and passing the stream of water through a reverse osmosis membrane.

BRIEF DESCRIPTION OF THE DRAWINGS

FIG. 3 is a flowchart showing the step-by-step process of a third preferred embodiment of the present invention implemented in a chiller.

DETAILED DESCRIPTION OF THE INVENTION

Figure 1:
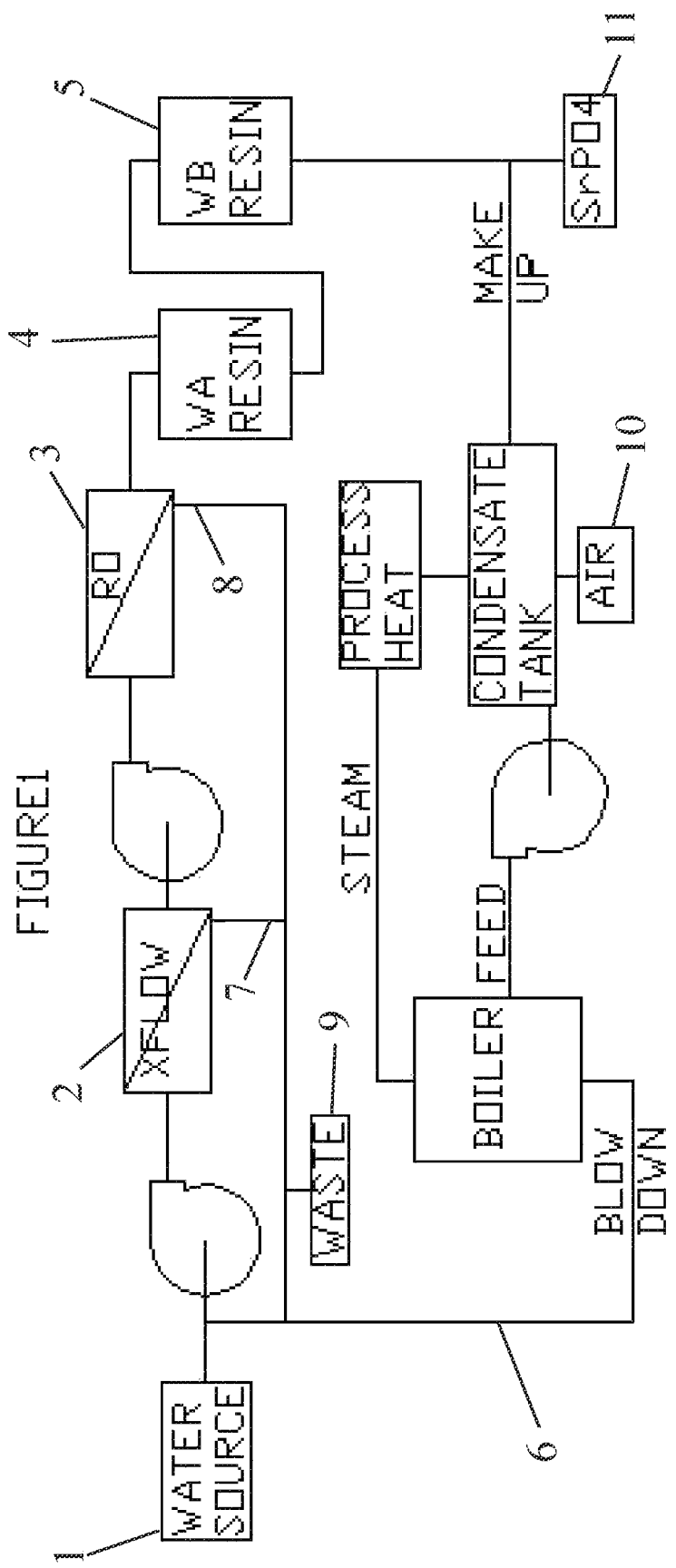
FIG. 1 is a flowchart showing the step-by-step process of one preferred embodiment of the present invention implemented in a boiler.

The embodiments discussed herein are merely illustrative of specific manners in which to make and use the invention and are not to be interpreted as limiting the scope.

While the invention has been described with a certain degree of particularity, it is to be noted that many modifications may be made in the details of the invention's construction and the arrangement of its components without departing from the scope of this disclosure. It is understood that the invention is not limited to the embodiments set forth herein for purposes of exemplification.

The present invention relates generally, but not by way of limitation, to a method of controlling corrosion and bacterial growth in boilers, chillers, cooling towers, heat exchangers, radiators, pipes, pools, metal finishing processes, and other similar environments.

Each of the above environments require that water come into contact with metal, concrete, or similar materials.

The first aspect of the present invention comprises introducing oxygen into the water. The idea that the presence of oxygen in water is a primary cause of iron corrosion is a widely accepted concept in the industry. For that reason, the prior art tries to remove as much oxygen from the water as possible through the use of deaerators and oxygen scavenging chemicals. In reality, high levels of oxygen in the water can inhibit corrosion.

During an experiment, the inventor placed a piece of polished carbon steel with water containing 1 ppm potassium carbonate in a sealed bottle containing 100% oxygen gas. After several months of storage, the steel showed no signs of tarnish or rust. This shows that oxygen can in fact inhibit corrosion by forming a transparent protective oxide coating over the metal.

In fact, many metals (i.e., magnesium, aluminum, titanium, and lead) are protected from corrosion by forming oxide coatings on their surfaces. When these oxide coatings are missing, these metals react with water to produce hydrogen gas and metal hydroxides. Iron is no exception. Iron reacts with water to produce rust. Therefore, without a protective oxide coating, iron will react with water to produce rust regardless of how much oxygen has been removed from the water.

A second experiment showed that stirring water with oxygen gas or air keeps the dissolved oxygen on the surface of the iron enough to keep the oxide coating intact.

Another common belief is that heat accelerates rust formation. A similar experiment as the two described above was conducted using boiling water. No signs of tarnish or rust were detected on the iron. This third experiment shows that heat does not compromise the protective oxide coating.

A fourth experiment using deionized water and 100% oxygen gas showed only minor amounts of rust formed initially and no additional rust formed after several months of storage. Likely, iron hydroxide formed until the pH of the water increased, at which point, the corrosion stopped.

In sum, introduction of 100% oxygen gas can dissolve in water sufficiently to inhibit corrosion without agitation, stirring, or flow of the water. When air is used as an oxygen source, however, water movement is required to maintain a dissolved oxygen level high enough to inhibit rust formation in distilled water with 1 ppm potassium carbonate. This means that boilers and chillers should maintain a flow of aerated water when not in use or the water should be drained.

Another aspect of the present invention may comprise reducing the total dissolved solids (TDS) level of the water. Commonly used methods of controlling corrosion and biological growth in these environments include addition of scale inhibitors such as sodium phosphate, oxygen scavengers, alkaline chemicals, and many other additives. Further, the water is often softened using ion exchange resins so that hardness ions such as calcium and magnesium are exchanged for sodium. Through all of these processes, the TDS level of the water rapidly increases. Therefore, in the case of boiler water, a significant volume of blowdown water is produced in order to maintain acceptable TDS levels of 1,500 to 3,000 ppm.

High alkalinity of the make-up water can easily raise the pH of the boiler water above 10 which is corrosive to iron. High salt levels can cause salts to deposit on the boiler tubes creating hot spots. Without the alkaline chemicals present, though, the oxygen scavengers can lower the pH to less than 7. Boiler water with a pH above 10 or below 7 causes corrosion.

If oxygen scavengers are no longer necessary and hardness is removed such that scale inhibitors are no longer necessary, a pH buffer agent is no longer necessary. For example, then, by maintaining a water TDS level of less than 50 ppm, hardness below the saturation level, and pH of 9 (by introducing if any sodium carbonate, sodium hydroxide, potassium carbonate, potassium hydroxide, sodium bicarbonate, potassium bicarbonate, or other suitable chemical) iron levels from boiler corrosion can be reduced to less than 1 ppm.

In sum, reducing the TDS of the water and eliminating the need for oxygen scavengers and other additives may reduce the corrosion rate of the metal. This is because high conductivity (TDS) of the water is a major driver of corrosion. Therefore, the water may be purified by passing water through a reverse osmosis (RO) membrane followed by a weak acid resin in H form followed by a weak base or strong base resin in free base, carbonate or bicarbonate form. The RO membrane reduces the TDS levels of the water while allowing some alkalinity and some traces of hardness to pass through. The weak acid resin in H form removes the alkalinity. This alkalinity puts a portion of the resin in sodium form which then removes hardness from the water. The weak base resin in free base form removes acid released from the weak acid resin. Additionally, this reduces the corrosive anion concentration (i.e. —chlorides, nitrates, phosphates, and sulfates) while increasing the pH, which generally reduces corrosion and the solubility of the copper and oxide coating. This brings copper and iron ion levels to less than 0.1 ppm. The final product may then be very low in alkalinity and hardness. Therefore, no antiscalants are required and very little pH adjustments, if any, may be required.

The chart below shows water quality levels in the prior art and one embodiment of the present invention:

| Boiler Water | Prior Art | Present Invention |
| --- | --- | --- |
| Blowdown TDS (ppm) | 3000 | 20 |
| Make-up TDS (ppm) | 150 | 1 |
| Hardness (ppm) | 50 | Less than 1 |
| Alkalinity (ppm) | 50 | Less than 1 |
| Oxygen Scavengers (ppm) | 30 | 0 |
| Antiscalant (ppm) | 10 | 0 |
| Buffer (ppm) | 20 | 0 |
| pH control $K_2CO_3$ (ppm) | | Less than 1 |

As can be seen, the present invention may practically eliminate the use of chemicals, while dramatically increasing boiler life, increasing heat transfer efficiency, and reducing make-up water consumption.

Another aspect of the present invention may include not adding phosphates or chlorine to the water. Boilers, cooling towers, and chiller water typically contain phosphate antiscalant additives, phosphate corrosion inhibitor additives, and phosphates that are naturally present in the water. The presence of phosphates in water stimulates biological growth. Trace amounts of biological growth and hardness can compromise heat transfer efficiency. Biological growth is usually killed by the addition of chlorine to the water. Routine addition of chlorine to the water is required because biological growth continues as long as phosphates are present.

Chlorine levels of even less than 1 ppm are known to cause iron and copper corrosion and concrete erosion. Further, chlorine converts to chlorides that are also corrosive. Since chlorine is consumed by organics in the water, the buildup of TDS and chlorides due to routine chlorine addition is significant.

According to the present invention, since water hardness is substantially removed and oxygen acts as the corrosion inhibitor, no phosphates need to be added to the water. Further, the RO membrane removes the phosphates that are naturally present in the water. Since phosphate levels may then be reduced to less than 0.1 ppm (although it is preferable to reduce them to less than 0.01 ppm), biological growth is controlled. The need for chlorine as an additive is, therefore, eliminated. Eliminating chlorine as an additive reduces corrosion of the metal caused by chlorine and chlorides. Further, the TDS buildup is dramatically reduced. The absence of chlorine also stops concrete erosion without the use of calcium or alkalinity additives.

Another aspect of the present invention may comprise the connecting of molybdenum metal or one or more of its alloys to iron metal equipment in the presence of dissolved oxygen or air in water. This connection improves the protective iron oxide coating and reduces the level of dissolved oxygen required on the iron metal surface to inhibit rust formation.

Another aspect of the present invention may comprise the connecting of nickel metal or one or more of its alloys to copper metal in the presence of dissolved oxygen or air in water. This connection improves the integrity of the protective copper oxide coating and reduces the level of dissolved oxygen required on the copper metal surface to inhibit corrosion.

Another aspect of the present invention may comprise using deionized water since it does not contribute to high TDS levels. Use of deionized water may reduce the volume of blow-down water required to maintain a low TDS (about 20 ppm) in a boiler. Aerated deionized water is preferred since oxygen is an excellent corrosion inhibitor.

Another aspect of the present invention may comprise recycling the blow-down water of boiler and cooling towers. The prior art encourages discharging blow-down water of boiler and cooling towers to waste. Since the blow-down water of the present invention may have a lower TDS level than most fresh water sources, it is desirable to pass the blow-down water through an RO membrane and return the permeate back to the boiler or cooling tower. This increases the water yield without disrupting the water chemistry.

Cleaning pipes, heat exchangers, boilers, chillers, cooling towers, and membranes generally involves the use of corrosive chemicals. Consequently, the process produces a hazardous waste that requires expensive disposal.

In the case of pipes, heat exchangers, boilers, chillers, and cooling towers the present invention recirculates water through a strong acid or weak acid ion exchange resin in hydrogen form to remove cations from the water. This releases cation free acid that leaches mineral deposits from all surfaces. Passing it through the resin removes cations and releases additional acid. Since the cations are absorbed, one only needs to neutralize the waste water to discharge to the sanitary drain. Citric acid may be added to the water to enhance cleaning, since the strong acid resin absorbs all the cations from the citric acid. The low pH (which is typically less than 3) kills bacteria. Therefore, it can be used to remove biological growth as well.

In the case of membranes, which must contain a pH of greater than 2, the present invention may pass a portion of the reject water through the strong acid resin bed in hydrogen form and return it to the feed pump at a pH of 2 to 7. This method may also be used to prevent scaling of a membrane that is processing hard water. Similarly strong acid in hydrogen form is used to clean membranes.

Lastly, the present invention may further comprise purifying waste water with a crossflow filter and RO membranes to produce superior water for boilers, chillers, and cooling towers.

FIG. 1 shows one preferred embodiment of the present invention implemented on a boiler. Describing FIG. 1 in detail, the source water 1 is passed through a crossflow filter 2 to remove suspended solids and organic matter such as soap. Then, the water is passed through an RO membrane 3 to remove the majority of salts and organic matter such as soap from the water. Traces of hardness and alkalinity may remain. Consequently, the water is then passed through a weak acid resin bed 4 in hydrogen form to remove alkalinity, hardness and trace metals. Then the water is passed through a weak base resin 5 in free base form to remove acidity released by the weak acid resin. The blow-down water 6, RO reject water 7, and crossflow reject water 8 may be blended with the source water 1 for processing. A portion of the crossflow reject water 8 is bled off to waste 9 to maintain proper water quality. Trace amounts of strontium phosphate 11 may be added to the makeup water to maintain an alkaline pH of 8 to 10 in the boiler water. Other additives may be used such as sodium carbonate, sodium hydroxide, potassium carbonate, potassium hydroxide, sodium bicarbonate, potassium bicarbonate, or other suitable chemicals. Air or oxygen gas may also be added 10 as a corrosion inhibitor.

Figure 2:
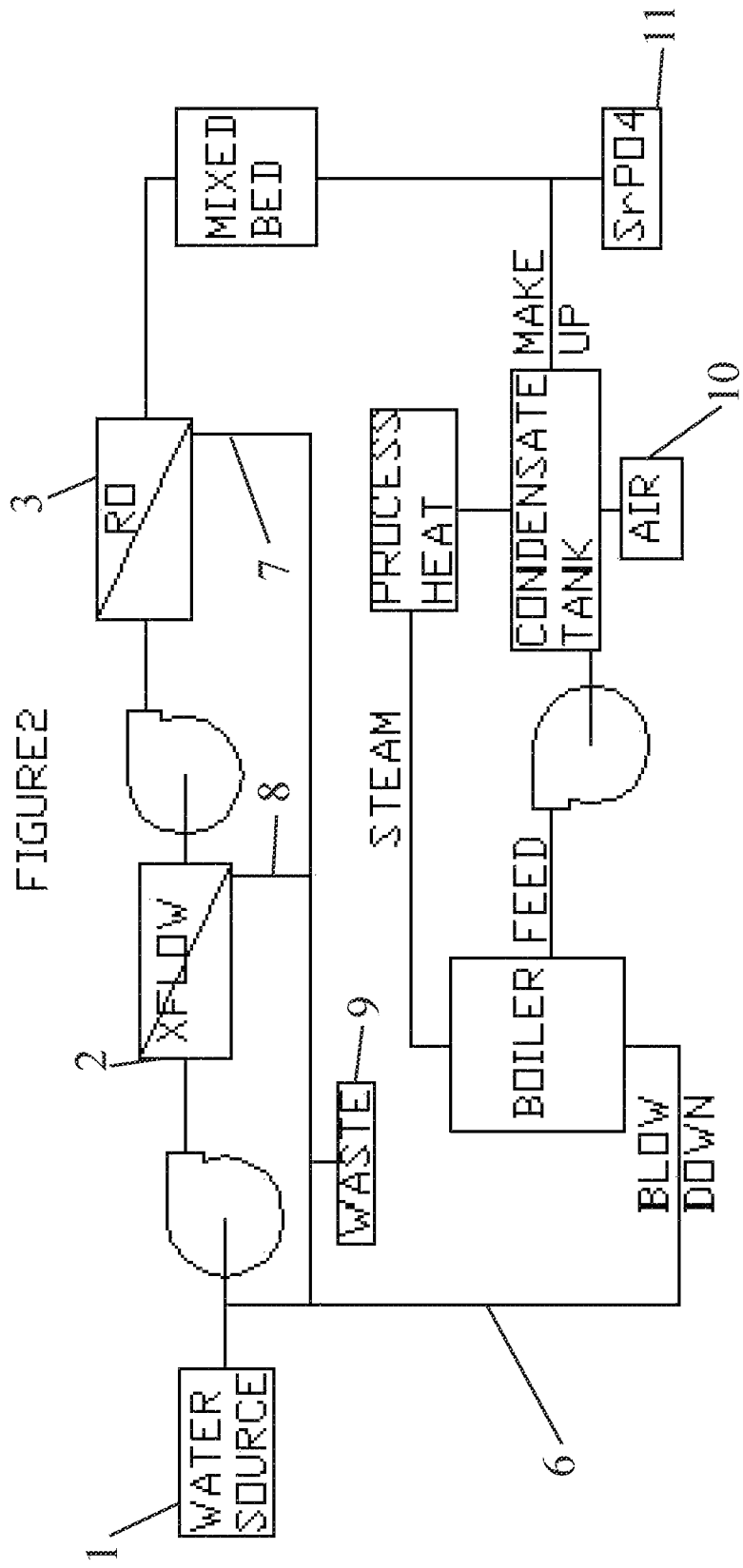
FIG. 2 is a flowchart showing the step-by-step process of a second preferred embodiment of the present invention implemented in a boiler.

FIG. 2 shows a preferred embodiment of the present invention implemented on a boiler. Describing FIG. 2 in detail, a mixed resin bed may be used in lieu of the weak acid and weak base resin pair shown in FIG. 1. The mixed resin bed produces low TDS water and removes last traces of chloride ions.

Either resin bed system produces low TDS water which is free of hardness, alkalinity, and trace metals. This low TDS, alkaline pH water source dramatically reduces the rate of corrosion in boilers. Maintaining a constant flow prevents the formation of local corrosion cells in the boiler.

FIG. 3 shows a preferred embodiment of the present invention implemented on a cooling tower. Cooling towers operate at lower temperatures. Therefore, alkalinity and moderate levels of hardness are tolerated. In cooling towers, chlorine and chlorides are the largest sources of metal corrosion and concrete erosion. The invention eliminates routine use of chlorine by supplying a source of sterile water that is low in phosphates, nitrates, and organic carbon (all of which are food for bacteria). Optionally, the tower water may be continuously filtered at or below the 0.2-micron level to remove any bacteria, algae, or suspended solids from the water. The algae may scavenge the last traces of phosphate and nitrate from the water. Then, the algae may be filtered out by the crossflow filter. The air and sunlight promote algae growth while inhibiting pathogenic bacteria growth. The algae act as a water purifier until all the food is removed from the water. Once the food is removed from the water, the algae die off due to starvation and are filtered out of the water. The water may also be filtered at the basin with a crossflow filter to enhance the removal rate. In most cases, returning the blow-down to the water source feed for reprocessing is sufficient. Designed in that way, the only waste water generated by the system is the crossflow and RO reject bleed.

The present invention may be used in metal finishing processes. Iron is typically cleaned with a tap water source and a cleaning agent such as citric acid or citric acid salt. If the part is rinsed in tap water and allowed to air dry, flash rust may occur on the part. Therefore, dilute phosphoric acid, molybdic acid, zinc slats, or chromic acid are used to inhibit flash rust with a conversion coating. After the metal is pacified, it is rinsed off with water and allowed to air dry. These pacification methods generate a secondary waste stream and discolor the metal. In all of these methods, regular tap water is commonly used which may not be oxygenated with air and may leave salt deposits after drying.

The present invention provides a coating on the washed part by rinsing with deionized water. The rinsed part is exposed to a flow of oxygenated deionized water with an additive such as sodium carbonate, sodium hydroxide, potassium carbonate, potassium hydroxide, sodium bicarbonate, potassium bicarbonate, or other suitable chemicals. The part may then dry without flash rust or salt deposits.

Whereas, the invention has been described in relation to the drawings attached hereto, it should be understood that other and further modifications, apart from those shown or suggested herein, may be made within the scope of this invention.

What is claimed is:

1. A method of inhibiting corrosion, scaling, and biological growth in equipment, wherein the equipment is selected from the group consisting of boilers, chillers, cooling towers, heat exchangers, radiators, and pipes, each of said equipment having water therein, said method comprising:
   adding oxygen water which is passed into and through said equipment;
   maintaining a pH level of the water at a level greater than 7; and
   limiting a total dissolved solids level of the water by passing through a reverse osmosis membrane.

2. The method of inhibiting corrosion and biological growth of claim 1 wherein the step of adding oxygen to the water is accomplished by aerating the water, adding pure oxygen, or both.

3. The method of inhibiting corrosion, scaling, and biological growth of claim 1 further comprising the additional step of limiting the total dissolved solids level to less than 100 ppm.

4. The method of inhibiting corrosion, scaling, and biological growth of claim 3 further comprising the step of removing alkalinity and hardness from the water by using a weak acid resin bed in H form followed by a weak base resin in free base form.

5. The method of inhibiting corrosion, scaling, and biological growth of claim 1 further comprising the step of removing phosphates from the water in order to inhibit biological growth.

6. The method of inhibiting corrosion, scaling, and biological growth of claim 1 further comprising the step of adding molybdenum metal or one of its alloys to the equipment in order to inhibit corrosion of iron.

7. The method of inhibiting corrosion, scaling, and biological growth of claim 1 further comprising the step of adding nickel metal or one of its alloys to the equipment in order to inhibit corrosion of copper.

8. The method of inhibiting corrosion, scaling, and biological growth of claim 1 wherein the water is deionized or distilled water.

9. The method of inhibiting corrosion, scaling, and biological growth of claim 1 further comprising the step of adding sodium carbonate, sodium hydroxide, potassium carbonate, potassium hydroxide, sodium bicarbonate, or potassium bicarbonate to the water.

10. The method of inhibiting corrosion, scaling, and biological growth of claim 1 wherein, in the case of the equipment being a boiler, a blow-down water feed is recycled by the additional step of mixing the blow-down water with an initial stream used to make the boiler's make-up water.

11. The method of inhibiting corrosion, scaling, and biological growth of claim 1 further comprising the step of maintaining a constant flow of the water.

12. The method of inhibiting corrosion, scaling, and biological growth of claim 1 further comprising the step of adding strontium phosphate to the water.

13. The method of inhibiting corrosion, scaling, and biological growth of claim 1 further comprising the step of maintaining a calcium level of the water and a magnesium level of the water below the saturation point.

14. The method of inhibiting corrosion, scaling, and biological growth of claim 1 further comprising the step of cleaning said equipment of mineral deposits by using a strong acid ion exchange resin in hydrogen form or a weak acid ion exchange resin in hydrogen form.

15. The method of inhibiting corrosion, scaling, and biological growth in a boiler comprising the steps of:
   filtering a water stream from a water source with a crossflow filter;
   thereafter passing the water stream through a reverse osmosis membrane;
   thereafter passing the water stream through a weak acid resin and a weak base resin;
   adding an additive to the water stream selected from the group consisting of sodium carbonate, sodium hydroxide, potassium carbonate, potassium hydroxide, sodium bicarbonate, and potassium bicarbonate; and
   oxygenating the water stream.

16. The method of inhibiting corrosion, scaling, and biological growth of claim 15 wherein the step of passing the water stream through a weak acid resin and a weak base resin comprises:
   passing the water stream through a weak acid resin bed in hydrogen form; and
   passing the water stream through a weak base resin bed in free base form.

17. The method of inhibiting corrosion, scaling, and biological growth of claim 15 wherein the step of passing the water stream through a weak acid resin and a weak base resin comprises passing the water stream through a mixed resin bed.

18. The method of inhibiting corrosion, scaling, and biological growth of claim 15 wherein a blow-down stream of the boiler is recycled by mixing the blow-downstream with the water source stream.

* * * * *